United States Patent [19]

Srail et al.

[11] Patent Number: 5,051,200
[45] Date of Patent: Sep. 24, 1991

[54] FLEXIBLE HIGH ENERGY MAGNETIC BLEND COMPOSITIONS BASED ON RARE EARTH MAGNETIC PARTICLES IN HIGHLY SATURATED NITRILE RUBBER

[75] Inventors: Raymond C. Srail, Parma; Richard A. Glover, Brookpark; Tiong H. Kuan, Hudson; Thomas R. Szczepanski, North Royalton, all of Ohio

[73] Assignee: The B. F. Goodrich Company, Brecksville, Ohio

[21] Appl. No.: 409,539

[22] Filed: Sep. 19, 1989

[51] Int. Cl.$^5$ .................. C04B 35/50; C08J 3/20; C08K 3/08; C08L 9/02
[52] U.S. Cl. .................. 252/62.54; 252/62.55; 524/439; 524/440
[58] Field of Search .................. 252/62.54; 524/439, 524/440

[56] References Cited

U.S. PATENT DOCUMENTS

4,327,346  4/1982  Tada .................. 335/296
4,789,591  12/1988  Nakamura .................. 428/328
5,002,677  3/1991  Srail et al. .................. 252/62.54

Primary Examiner—Prince E. Willis
Assistant Examiner—Thomas Steinberg
Attorney, Agent, or Firm—Daniel J. Hudak; Nestor W. Shust

[57] ABSTRACT

A flexible magnetic blend composition is provided which is comprised of high energy rare earth magnetic particles in a flexible high temperature resistant and oil resistant polymer binder. The binder system preferably comprises a highly saturated nitrile rubber (HSN) or a polymer alloy of the same in which a HSN is the major polymer and also contains additives which are compatible with processing, subsequent electron beam curing, and final product performance. The binder system is high loaded, usually from about 50 to about 70 volume percent, with the high energy rare earth magnetic particles, which can produce bonded magnets with a maximum energy product of at least 2.5 megagauss-oersteds, a remenance, $B_r$ of at least 3400 gauss, a coercive force, Hc, of at least 2900 oersteds and an intrinsic coercivity, Hci, of at least 5000 oersteds. The process for production of this system involves the binder system and rare earth magnetic particles being mixed and then formed into a final geometry before being cured by high voltage electron beam radiation. The electron beam curing in the solid state fixes dimensional stability, magnetic properties, and oil, solvent and chemical resistance of the part even when exposed to subsequent hostile temperature environments of 100° C. or higher. Further, the HSN binder system reduces oxidation of the rare earth magnetic particles from subsequent hot air aging when compared to conventional nitrile elastomer binder system. Any off geometry parts or trim produced in the process prior to radiation curing can be recycled through processing several times without fear of premature cure.

12 Claims, 1 Drawing Sheet

FIG.-1

FIG.-2

FLEXIBLE HIGH ENERGY MAGNETIC BLEND COMPOSITIONS BASED ON RARE EARTH MAGNETIC PARTICLES IN HIGHLY SATURATED NITRILE RUBBER

FIELD OF THE INVENTION

This invention relates to flexible high energy rare earth magnetic blend compositions comprised of a high temperature resistant, oil, solvent and chemical resistant polymer binder which is highly loaded with rare earth particles. The binder system and particles are mixed and then shaped before curing which is effected by exposure to high voltage election beam radiation.

BACKGROUND

While flexible magnetic blend compositions have been known for some time, a high temperature oil resistant flexible rare earth magnetic material in strip form has continued to be a target for research and development. In particular, there has been interest in finding such a material for permanent magnet motors where the vastly increased performance of rare earth allows for lighter more powerful motor designs than those feasible with conventional bonded or sintered ferrite magnets. In addition, acoustical devices, copier rolls and instrumentation devices offer additional market possibilities for this material.

In particular, it has been known to use a conventional nitrile rubber system containing chemical curing agents, such as sulfur, for binders for use with rare earth particles. An example of such a product is sold by Polymag Incorporated, Belmont, N.Y., under the designation NEOMAG "70F" which uses "Magnequench", a $Fe_{14}Nd_2B$ powder, made by Delco Remy, a division of General Motors, Anderson, Ind. It is believed that this product is made by an extrusion/rolling process to reach the final thickness and heat cured under pressure to crosslink the binder system. The final cured strip cannot be recycled or reprocessed. Aging of the sheet at temperatures above 100° C. is rapid and causes embrittlement. In addition, the conventional nitrile binder in the magnet does a poor job in protecting the neodymium iron-boron powder from oxidation and the resultant rapid loss of magnetic properties.

SUMMARY OF THE INVENTION

The invention relates to a flexible high energy rare earth magnetic blend composition comprising a high temperature, oil, chemical and solvent resistant, electron beam curable binder system which will accept a high loading of rare earth magnetic particles. The binder system must not only "wet out" the magnetic particles at the desired concentration, but also must give proper characteristics to the mixture to allow it to be processed and shaped before curing. A preferred binder system is based on a highly saturated nitrile elastomer having a bound acrylonitrile concentration of 36 to 45 percent by weight and a percent saturation of at least 85 percent by weight. The composition also comprises at least 45 percent by volume, and preferably at least 55 percent by volume of rare earth magnetic particles.

The invention further relates to a process for making a product from the blend composition, which comprises mixing the binder and the magnetic particles to form a uniform mixture, orienting the rare earth magnetic particles if they are not isotropic magnetically, shaping a product from the mixture, and curing the mixture by exposing the mixture to an electron beam from a high voltage electron beam accelerator.

It is an advantage of the present invention to provide a flexible rare earth magnetic blend composition which has improved resistance to certain liquids such as resistance to oil, to oxidized sour gasoline and to oil additives. Moreover, this improved resistance is maintained even at elevated temperatures.

It is a further improvement to provide a flexible rare earth magnetic blend composition having improved air-aging characteristics, ozone resistance, steam resistance and high temperature resistance.

It is a further improvement to provide a flexible rare earth magnetic blend composition, as well as a method of manufacture, in which the product is cured at virtually room temperature, i.e., less than 50° C., and at atmospheric pressure. It is a further advantage that the geometric memory and dimensional structure are thus locked in even if the product .is exposed to subsequent temperatures of more than 125° C. It is a further advantage that this can be accomplished in a relatively short period in continuous processing, i.e., in one to four passes at 2.5 megarads dosage of radiation per pass at 20 feet per minute. It is a further advantage that the magnetic properties memory is also set in this manner.

A further advantage of the present invention is that product which is off-dimension in geometry prior to electron beam curing can be recycled even many times. This represents a large savings in product.

DETAILED DESCRIPTION OF THE INVENTION

The invention relates to flexible rare earth magnetic blend compositions. The blend compositions comprises a polymer binder system which is highly loaded with high energy rare earth magnetic particles.

In order to provide an acceptable binder, the following criteria must be met: The binder needs to accept a high volume loading of high performance rare earth powder sometimes as high as 70 volume percent. The binder needs to have a low viscosity at processing temperatures and enough hot strength to allow a product and particularly an extruded strip to be made from a mixture of rare earth magnetic powder and the binder. The binder must provide a sufficiently high uncured "green strength" at room temperature so that the product can be formed and handled prior to curing. The compound should be curable by electron beam radiation. The cured magnet compound needs to have a long term high-temperature resistance of at least about 100° C., and an oil resistance where volume swell in ASTM #1 or ASTM #3 oils is less than 5 percent after 46 hours of soaking at 23° C.

A preferred polymer binder system which fits the above criteria is based on a highly saturated nitrile elastomer. The elastomer consists of the following chemical structures:

from the bound acrylonitrile;

from the hydrogen saturated butadiene component; and a small amount of from the butadiene component left unsaturated.

A suitable nitrile elastomer is from 30 to 50 percent acrylonitrile, the remainder being butadiene in the elastomer before saturation (i.e., the elastomer before saturation is known as NBR or nitrile rubber). Preferably, the elastomer is 34 to 48 percent bound acrylonitrile and most preferably 36 to 45 percent bound acrylonitrile. The elastomer is preferably at least 85 percent saturated, and more preferably at least 90 percent saturated. Commercially available preferred elastomers and their specifications are set forth in Table I.

TABLE I

| Elastomer Designation | Manufacturer | Specific Gravity | Bound ACN Wt. % | Saturation Percent | Mooney Viscosity ML1 + 4 @ 100° C. |
|---|---|---|---|---|---|
| Zetpol ® 1010 | Zeon Chemicals, Inc. Bayport, Texas | 1.00 | 44 | 96 | 80 |
| Zetpol ® 1020 | Zeon Chemicals, Inc. Bayport, Texas | 1.00 | 44 | 90 | 75 |
| Zetpol ® 2000L | Zeon Chemicals, Inc. Bayport, Texas | 0.98 | 36 | 99 | 65 |
| Therban ® 2207 | Mobay Corporation Pittsburg, Pa. | 0.98 | 43 | 99 | 75 |
| Tornaq ® C4545 | Polysar Ltd. Sarnia, Ontario | 1.00 | 45 | 95 | 45[1] |
| Tornaq ® A4555 | Polysar Ltd. Sarnia, Ontario | 1.00 | 45 | 99.5 | 55[1] |

[1]Reported as Mooney Viscosity ML1 + 4 @ 125° C.

It is believed to be preferable in the present instance to utilize a highly saturated nitrile elastomer such as those described above. Although a similar chemical structure could be obtained by copolymerization of ethylene with acrylonitrile, the preferred binder polymer is usually obtained by hydrogenation of olefin segmers of NBR. The hydrogenation method can be carried out after preparing the NBR so that NBR's having differing concentrations of acrylonitrile can be prepared. Further, the amount of saturation can be controlled. The molecular weight of such elastomers before and after hydrogenation has shown little change. The temperature dependence of Mooney viscosity of the saturated nitrile polymer is the same as conventional NBR although, the higher the degree of hydrogenation, the higher the Mooney viscosity. The glass transition temperature varies according to those of the raw materials, but ranges from minus 15° C. and minus 40° C.

During hydrogenation, it is important to achieve selective hydrogenation of the carbon-carbon double bonds without hydrogenation of the cyano groups. When using a palladium catalyst, the 1,2 segmers in the butadiene units are preferentially hydrogenated, and the polymer properties are decided according to the amount of remaining 1,4 segmers. Of course, other catalyst systems are also known. Patents which relate to the hydrogenation of nitrile butadiene elastomers include U.S. Pat. No. 3,700,637 to the Shell Oil Company; Great Britain Patent 1,558,491 to Bayer A. G.; German Patent 3,329,974-A to Weinstein (Goodyear); U.S. Pat. No. 4,464,515 to Polysar; Japanese Kokai Patent 59-117501 to Nippon Zeon; Great Britain Patent 2,011,911A to Johnson, Matthey; U.S. Pat. No. 4,384,081 and Japan Kokai Patent 57-202305 to Nippon Zeon; U.S. Pat. No. 4,452,951 and Japan Kokai Patent 57-295404 to Nippon Zeon; U.S. Pat. Nos. 4,337,329 to Nippon Zeon; 2,585,583 to Du Pont; 4,469,849 to Johnson, Matthey; and 4,452,950; all of which are incorporated herein by reference as if fully set forth herein.

The polymer system which is suitable for the present invention may include appropriate alloys or blending agents so long as the specified criteria are maintained. The polymer system is preferably at least 70 percent HSN (highly saturated nitrile rubber) and can be up to 30 percent by weight of alloying polymers. One such alloying thermoplastic polymer is an impact modified acrylonitrile-methylacrylate copolymer, specific gravity =1.15, known as "Barex" 210 produced and sold by B. P. Chemicals International, Cleveland, Ohio. "Barex" 210 can be blended up to 30 weight percent of the total polymer system (HSN being the remaining 70 percent) to produce a less flexible magnet with improved chemical/ solvent resistance.

Another such alloying polymer is a copolyester thermoplastic elastomer containing both polyether and polyester segments known as "Hytrel" 4056, produced by the Du Pont Company, Elastomers Division, Wilmington, Del. "Hytrel" 4056 has a melting point of 148° C., specific gravity=1.16, Shore D hardness of 40, and a melt flow rate of 5.3 gm/10 minutes at 190° C., 2100 g load (ASTM D 1238) and exhibits excellent oil resistance even at high temperatures. "Hytrel" 4056 can be used up to 30 weight percent of the total polymer system (HSN being the remaining 70 percent) to produce flexible magnets with a high level of oil resistance, improved cold temperature properties and reduced material cost while still retaining good high temperature properties.

There are several other blend and/or electron beam compatible polymers, both elastomeric and thermoplastic, that can be blended up to 30 weight percent of the total polymer system, the polymer system masterbatched with additives to produce a binder system, the binder system blended with a rare earth powder to form a magnetic compound, the magnetic compound then processed into a final geometrical shape and electron beam cured to produce the final magnetic part. The selection of the alloying polymers depends not only on the desired processibility of the compound but also the desired properties of the final magnetic part. In the particular case of easily oxidizable rare earth powders, it is useful to avoid the halogenated polymers in the binder system which can generate the halogen ion or acid upon hydrolysis and/or heating of the product, causing severe degradation of the rare earth powder and subsequent loss of magnetic properties.

By the term "rare earth magnet or rare earth magnetic particles," it is meant any magnetic material or magnetizable material which contains at least one rare earth element therein, that is an element having an atomic number of from 57 to 71. Such elements can be contained in either minor or major amounts. Such rare earth magnets can contain minor or major amounts of non-rare earth elements such as iron, cobalt, nickel, boron, and the like. Another definition of rare earth magnetic materials are compositions, that is alloys and/or mixtures, containing one or more rare earth elements which generally have good magnetic properties, that is magnetic properties such as generating a magnetic force which is greater than that obtained utilizing conventional non-rare earth magnets such as alloys of nickel, iron, nd cobalt. Often times the residual induction value (Br) of the rare earth magnets is 25 percent greater than that generated by conventional non-rare earth magnetic materials such as barium ferrite.

The various types of rare earth magnets or magnetic materials which can be protected with regard to corrosion as well as to oxidation are generally known to the art as well as to the literature. Such rare earth magnets are described in various articles and especially patents as in U.S. Pat. Nos. 4,496,395 to Croat; 4,558,077 to Gray; 4,597,938 to Matsuura et al; 4,601,875 to Yamamoto et al; 4,684,406 to Matsuura et al; European Patent Application 108,474 to General Motors; and European Patent Application Nos. 106,948 and 134,304 to Sumitomo Special Metals Company Ltd., which are hereby fully incorporated by reference with regard to all rare earth magnet compositions, methods of preparation, and the like.

For example, a preferable type of rare earth magnet can contain alloys neodymium or praseodymium in combination with iron and boron, as in elementary ratios of 2 moles of neodymium to 14 moles of iron to 1 mole of boron, all as described in U.S. Pat. No. 4,558,077.

More specifically, the primary phase of magnetic alloys is believed to have the composition $RE_2Fe_{14}B$ with a preferred composition being in the range of $RE_{0.12-0.15} B_{0.4-0.09} FE$ (atomic fractions). RE is a rare earth element, preferably neodymium, or praseodymium. Such alloys are known under the trade name "Magnequench." Die upset oriented alloys of the above-noted neodymium, iron, boron, and optional cobalt alloys can also be utilized and such magnets or powders thereof are generally well known to the art and to the literature and are commercially available. Alloys of the same containing small amounts of other compounds such as aluminum, gallium, copper, iron zirconium, titanium, and the like, can also be utilized.

Two other preferred types of rare earth magnets are alloys of samarium and cobalt where the mole ratio can be approximately 1 to 5 or approximately 2 to 17, respectively. Other suitable rare earth magnets are made from alloys of samarium, cobalt, and iron wherein the iron is generally present in small amounts. Still other rare earth magnet alloys contain praseodymium and cobalt.

A large class of rare earth magnet or magnetic materials are various alloys of iron, boron, at least one rare earth element, and optionally cobalt. In the three component system, the amount of boron is generally from about 2 percent to about 28 percent by weight, the amount of the one or more rare earth elements is from about 8 percent to about 30 percent by weight, with the remaining balance being iron. When cobalt is utilized, the amount of the one or more rare earth elements is from about 8 to about 30 percent by weight, the amount of boron is from about 2 to about 28 percent by weight, cobalt is utilized in an amount of from about 0.1 to about 50 percent by weight, and the balance is iron.

The most preferred type of magnet is a form of rare earth powder for these flexible high temperature and oil resistant bonded rare earth magnets, is the annealed and crushed melt spun ribbon that is described in previously cited patents, U.S. Pat. Nos. 4,496,395 and 4,558,077, and known as "Magnequench", produced by Delco Remy, Division of General Motors, Anderson, Ind. The crushed ribbon "powder" forms available thus far have isotropic (non-directional) magnetic properties, one such product being sold commercially by Deco as DRB80924 "Magnequench" powder. This powder has a particle size specification by the manufacturer of 100 weight percent through a U.S. 40 mesh screen (420 micron opening) with a maximum of 15 weight percent finer than a U.S. 325 mesh screen (44 micron opening). A typical screen analysis of the "as received" powder is included in Table II, along with "aspect ratio" and relative oxidation rate of each sieve fraction. Aspect ratio ("AR"), is defined as the average maximum particle dimension of that screen fraction divided by the thickness of the "Magnequench" ribbon which was used to produce the particulate rare earth magnet material. The relative oxidation rate at 300° C. in a hot air oven is also included in Table II, with the $-40+60$ fraction (i.e., fraction A) oxidation rate defined as 100.

TABLE II

TYPICAL SCREEN ANALYSIS, ASPECT RATIO, AND RELATIVE OXIDATION RATE OF MAGNEQUENCH DRB 80924 POWDER SCREEN FRACTIONS

| Screen Fraction Designation | U.S. Sieve Mesh Equivalent | Weight Percent Present | Maximum Particle Size, Microns | Minimum Particle Size, Microns | Est. Avg. Maximum Particle Dimension, Microns | Estimated Thickness of Particle[1], Microns | Aspect Ratio, $AR^2$ | Relative Oxidation Rate |
|---|---|---|---|---|---|---|---|---|
| A | $-40 + 60$ | 3.5 | 420 | 250 | 335 | 21.7 | 15.44 | 100 |
| B | $-60 + 80$ | 9.4 | 250 | 177 | 214 | 21.7 | 9.86 | 89 |
| C | $-80 + 100$ | 13.3 | 177 | 149 | 163 | 21.7 | 7.51 | 127 |

TABLE II-continued

TYPICAL SCREEN ANALYSIS, ASPECT RATIO, AND RELATIVE
OXIDATION RATE OF MAGNEQUENCH DRB 80924 POWDER SCREEN FRACTIONS

| Screen Fraction Designation | U.S. Sieve Mesh Equivalent | Weight Percent Present | Maximum Particle Size, Microns | Minimum Particle Size, Microns | Est. Avg. Maximum Particle Dimension, Microns | Estimated Thickness of Particle[1], Microns | Aspect Ratio, AR[2] | Relative Oxidation Rate |
|---|---|---|---|---|---|---|---|---|
| D | −100 + 140 | 26.1 | 149 | 105 | 127 | 21.7 | 5.85 | 125 |
| E | −140 + 200 | 26.6 | 105 | 74 | 90 | 21.7 | 4.15 | 163 |
| F | −200 + 325 | 13.5 | 74 | 44 | 59 | 21.7 | 2.72 | 217 |
| G | −325 | 7.6 | 44 | 0[4] | 22[4] | 21.7 | 1.01[4] | 408 |
| | TOTAL | 100.0 | | | | | | |

[1] Average thickness of "Magnequench" ribbon determined by measuring 50 pieces of ribbon; $\bar{x}$ = 21.7 microns, S = 4.2 microns, N = 50
[2] Aspect ratio, AR = $\frac{\text{Average maximum particle dimension}}{\text{thickness of ribbon}}$
[3] Relative oxidation rate at 300° C. in hot air oven. Fraction A (US Sieve −40 + 60 mesh) defined as 100
[4] It is doubtful that any particles exist below 5 microns in this material since they would oxidize rapidly in air and this phenomena has not been observed when the powder is exposed to ambient atmosphere. Therefore, it is expected that the average maximum particle dimension and aspect ratio is slightly higher than that indicated in the table for fraction G.

The significance of Table II for these high temperature and oil resistant flexible bonded rare earth magnet products is that the "Magnequench" ("MQ") crushed ribbon is extremely brittle even after annealing by the manufacturer. Particles with a high aspect ratio (i.e. above 6.0) subsequently fracture easily during some of the processing operations required to produce a finished product (i.e. milling, calendaring, extrusion). As shown in Table II, the finer particle fractions oxidize at a much higher rate than the coarse fractions. Thus, precautions must be taken in determining how fine a particle fraction can be utilized before hot air aging problems (i.e., loss of magnetic properties) during processing and in the application are manifested. However, there is currently considerably world-wide research activity focusing on coatings or platings for MQ powders, not only to enhance adhesion to binder systems but also to protect the powders from oxidation. Even with coatings or platings present, the high aspect ratio fractions of MQ will fracture during processing, thus exposing uncoated, more easily oxidizable surfaces. Therefore, a maximum aspect ratio ("AR"), of 6.0 is recommended for Magnequench powders used in these high temperature and oil resistant flexible bonded MQ magnets regardless of whether the powder is coated or uncoated.

To answer the question of whether the finer particle sizes of MQ required to avoid process fracturing of the particles would affect the ability to achieve high volume loadings, an experiment was run involving compression molding of liquid epoxy bonded MQ powders of various size fractions at different pressures to determine the volume packing of the powders. Samples were run using 98 weight percent MQ powder (DRB80924), and 2 weight percent liquid epoxy held respectively at 50,000 psi, 75,000 psi and 100,000 psi compression pressure until cured. The results are set forth in Table III, including a comparison of the "as received" powder.

TABLE III

VOLUME LOADING OF "MAGNEQUENCH" DRB 80924
FINE SIEVE FRACTIONS ACHIEVED AT DIFFERENT COMPRESSION MOLDING PRESSURES

| Sample Designation | Incls. Sieve Fractions (See Table II) | Equivalent U.S. Screen Series | Weight % Utilization of Orig. Powder (See Table II) | Volume Percent Magnequench vs. Compression Molding Pressure (PSI)[2] | | |
|---|---|---|---|---|---|---|
| | | | | 50 KPSI Vol % | 75 KPSI Vol % | 100 KPSI Vol % |
| ABCDEFG[1] | A + B + C + D + E + F + G | −40 Mesh | 100.0 | 72.9 | 75.3 | 77.1 |
| DE | D + E | −100 + 140 Mesh | 52.7 | 72.6 | 75.4 | 77.1 |
| DEFG | D + E + F + G | −100 Mesh | 73.8 | 72.3 | 74.9 | 76.2 |
| EFG | E + F + G | −140 Mesh | 47.7 | 71.8 | 74.1 | 76.4 |
| FG | F + G | −200 Mesh | 21.1 | 71.0 | 73.3 | 75.0 |

[1] Original sample, i.e., as received
[2] Based on 98 wt. % MQ powder, 2 wt. % epoxy blend kept under specified pressure until cured.

It can be seen that fine particle fractions can be compacted almost as well as the original "as received" powder, with even the very fine FG fraction compacting to within 2 volume percent of the original powder. This very fine fraction (FG) may be the preferred fraction if a suitable oxidation resistant coating can be developed for the MQ powders. In order to utilize most of the original powder and stay below the 6.0 aspect ratio, the DEFG fraction was used in most of the examples which utilize 73.8 percent of the original powder (−100 mesh). The oversized particles (+100 mesh), of course, could be crushed under argon gas to the −100 mesh size required to meet the 6.0 aspect ratio maximum, thus utilizing 100 percent of the original "as received" powder. It should be noted that in the flexible bonded MQ sheet or extrusions with a high melt viscosity HSN binder system and with lower forming pressures used compared to the compression molded samples, an upper limit for volume loading of MQ powder in the flexible bonded products would be about 70 volume percent. A volume loading of 65 volume percent loading of MQ powders was targeted in the examples.

There are several "versions" of "Magnequench" powders either currently available commercially or anticipated to be available from Delco Remy in the future. The magnetic properties of two of the isotropic powders commercially available, DRB80924 (previously mentioned) and DRB81700, are shown below. Magnetic properties were determined on a compressed powder sample using a vibrating sample magnetometer, at 0.1 second time constant sweep at 200 oersteds per second, magnetized with a minimum field of 48,000 oersteds.

| TYPICAL MAGNETIC PROPERTIES COMMERCIAL MQ POWDER | | |
|---|---|---|
| MQ Powder | DRB80924 | DRB81700 |
| Residual induction, Br, gauss | 7,600 | 8,200 |
| Intrinsic coercive force, Hci, oersteds | 14,800 | 9,000 |
| Maximum energy product, $BH_{max}$, MgOe | 11.5 | 12.5 |

Other isotropic MQ powders from rapidly quenched melt spun ribbons are expected to be commercialized with Br ranging from 6,000 to 9,000 gauss, Hci from 5,000 to 17,000 oersteds, and $BH_{max}$ from 6.0 to 15.0 MgOe. These powders, along with DRB81700, represent alloy modifications from the original $Nd_2Fe_{14}B$ compositions represented by DRB80924 and are targeted for specific use applications. In addition, powders have been made by crushing sintered die-upset MQ3 magnets. The MQ3 magnets are anisotropic in nature and possess a Br of 11,750 gauss, a Hci of 13,000 oersteds, and a $BH_{max}$ of 32.0 MgOe in the preferred magnetic direction. It is felt that a crushed melt spun MQ ribbon with similar anisotropic (i.e., orientable) magnetic properties may be achieved in the future. The present high temperature oil resistant flexible binder system could be expected at 70 volume percent loading of these powders to have about 70 percent of the Br, 50 percent of the $BH_{max}$, and the same Hci as the powder properties listed above.

Other rare earth magnet compositions are set forth in "Rare Earth Permanent Magnets," E. A. Nesbitt and J. H. Wernick, Academic Press, New York 1973, which is hereby fully incorporated by reference.

Additives which can be added to the blend composition include processing aids and antidegradants as are known in the art. Particularly suitable are additives which are compatible with electron beam curing, that is, which will not seriously interfere with the binder crosslinking reaction, become embrittled, or be depolymerized by the radiation dosage. In general, additives used in chemical peroxide cures of elastomers are very often suitable for electron beam curing. Of the processing aid/lubricant additives, some preferred materials include (1) "Struktol" TR016, a mixture of selected and specially treated fatty acid derivatives, specific gravity=1.00, melting point=99° C., sold by Struktol Corporation, Stow, Ohio; (2) "A-C" 617, a low molecular weight polyethylene homopolymer, melting point =102° C., Viscosity=148cps at 140° C., produced by Allied Corporation, Morristown, N.J.; (3) low levels, usually less than 1 part per hundred by weight of binder polymer(s) of stearic acid. Some preferred antidegradants are "Vanox" ZMTI, zinc 2-mercaptoluimidazole antioxidant powder, specific gravity=1.69, melting point =300° C., sold by R. T. Vanderbilt Company, Inc. Norwalk, Conn. and "Naugard" 445, a 4,4'di (alpha,alpha,dimethylbenzyl) diphenyl amine antioxidant, specific gravity=1.14, melting point 96° to 98° C., sold by Uniroyl Chemical Co., Middlebury, Conn. With the exception of the A-C 617, these additives are usually master batched with the highly saturated nitrile (HSN) elastomer or polymer alloys in which HSN is the major polymer in an internal mixer (e.g. Banbury) prior to blending with the rare earth powder on a mill. In the case of the AC617 additive, the other binder additives are masterbatched first and the low melt viscosity A-C 617 is added later on a mill during the rare earth incorporation into the binder system. Except where noted, these additives can be present individually up to 10 parts by weight per hundred of "polymer binder" and preferably at about 1 to 5 parts per hundred of "polymer binder". Other processing aids and antidegradants of the type mentioned above or as known in the art may be incorporated in the binder masterbatch with the combined total level of all additives up to 10 parts by weight per hundred of polymer.

The process of the present invention comprises mixing a binder system and rare earth magnetic particles to form a uniform mixture, and shaping a product from said mixture, and curing said mixture by exposing said mixture to an electron beam from an electron beam accelerator.

Preferably the binder system containing additives is masterbatched in an internal mixer such as a Banbury mixer, at 320° F. maximum temperature followed by sheeting out on a two-roll mill (1.3 friction ratio) with the fast roll maintained at 250° F. and the slow roll under 200° F. The rare earth/binder system mixing step can take place on any conventional compounding equipment, such as a mill, a Banbury mixer or a Buss Kneader. An example of the rare earth/binder system compounding step would be the addition of the masterbatched binder system to a mill for subsequent stepwise addition of the particulate rare earth to achieve a loading of at least 50 volume percent and more preferably at least 60 volume percent rare earth particles. The maximum volume loading of rare earth particles is usually dependent upon the maximum volume packing as outlined in Table II for MQ powders. The rare earth-/binder system mixing, blending and banding is accomplished, as one example, on a two roll mill of friction ratio (speed differential) of 1.3 to 1.5. Batches can be mixed and banded by keeping both rolls at temperatures below 130° F. (54° C.).

Alternatively, the fast roll of the mill should be maintained at 250° F. while the slow roll is kept at least 50° F. colder during the compounding step to achieve good mixing and banding of the compound. This would be the temperature condition used when incorporating the A-C 617 polyethylene as an additive during the final compounding step. Although MQ powders can be incorporated at these temperatures for short periods at room atmospheres without significant oxidation problems, other more oxidation prone rare earth powders would require an inert gas atmosphere, such as argon, to be present during compounding. When the blend is uniform, the compound banded sheet is removed from the mill and allowed to cool prior to being granulated on conventional granulating equipment, the granulator being flooded with argon to provide feed for extrusion or other conversion processes such as calendaring.

When extruding, a suitable example of an extruding machine is a single screw extruder with an L/D ratio of less than 20:1 and a straight taper screw with a compression ratio less than 1.5to 1. Extrusion takes place at temperatures in the range between about 110° C. and 180° C., depending on the compound being extruded. If the rare earth particles contained in the compound are particularly oxidation sensitive, it is useful to equip the feed hopper with a closed system box which will maintain the feed under an argon atmosphere.

Because the currently available rare earth powders such as the crushed melt spun "Magnequench" ribbons are isotropic in nature, no specific die design or induced magnetic field during extrusion is necessary to maximize the magnetic properties in one geometrical dimension, for instance through the thickness of an extruded strip. It is anticipated, however, that rare earth powders with a preferred magnetic orientation (i.e., possessing anisotropy) will be available in the future. If so, the extruder can be equipped with suitable orienting means, such as a directional high shear die and/or induction in which the molten mixture is subjected to a strong directed magnetic field, and particularly a field of at least about 12,000 oersteds. These orienting means would produce optimized magnetic properties in the product in the preferred direction.

The formed mixture is subjected to a curing step, by passing the formed product through electron beam radiation. The major advantage of electron beam processing of polymer compositions over competitive chemical processes is that irradiation can be carried out on previously shaped products such as film, tubing, wire, and other profiles, moldings, etc., in the solid state at ambient temperatures. Electron beam processing can offer significant cost savings through the elimination of catalyst accelerators and other components of conventional chemical crosslinking or other polymer modification systems. It also eliminates or reduces costs associated with the mixing of these ingredients in such polymer compositions and avoids expenses incurred in connection with limitations on processing speeds to prevent excessive exotherm and probable scorching and precure of chemical curative bonded rare earth compounds. The chemical curative loaded rare earth compounds can also "shelf scorch" prior to processing and tend to cause poor product aging characteristics because of the curative and accelerator fragments left in the compound after heat cure. Heat curing can also increase the risk of oxidation of the rare earth powders contained in the compound. Electron beam curing is carried out at ambient temperature conditions, usually less than 50° C. Furthermore, expensive and energy wasting heat curing equipment such as steam autoclaves or continuous drum vulcanizers are not required when crosslinking with electron beam equipment. By way of example, the Dynamitron, a high potential electron beam accelerator produced by Radiation Dynamics Inc., Long Island, N.Y., is described in detail below to illustrate the equipment which may be used to effect curing.

The Dynamitron power supply is a high frequency voltage generator which employs a patented, parallel-fed cascaded rectifier system developed by Radiation Dynamics, Inc., Long Island, N.Y. An RF oscillator feeds power to a high "Q" parallel resonance circuit consisting of an RF transformer and RF electrodes. The RF electrodes establish an electrostatic field along the length of the rectifier array. This electrostatic field is capacitively coupled to each rectifier by the corona rings. The rectifiers convert the RF potential to a DC potential. The direct current components of the rectifiers add in series to establish the desired potential at the terminal. The potential developed at the power supply terminal is impressed directly upon the acceleration column.

The acceleration column consists of an evacuated uniform field beam tube and an electron gun. The beam tube is constructed of large I.S. re-entrant stainless steel dynodes and glass insulators. The re-entrant design of the dynodes completely shields both the glass insulators and seals from radiation, providing long and maintenance-free beam tube life. Each dynode is electrically connected to a high resistance bleeder network which provides the required potential between dynodes.

The electron gun is a straightforward fixed focus device, employing a heated cathode which is mounted on insulated standoffs in a copper plate. Filament power is provided by an independent source.

Electrons emitted from the heated cathode are focussed by a Pierce lens and accelerated within the beam tube to the full DC potential of the Dynamitron cascaded rectifier system. The result is a well-defined, mono-energetic electron beam.

The oscillator converts 60 Hz line voltage to approximately 15 kV at 100 kHz. This is the RF driving power for the cascaded rectifier system.

An industrial vacuum system is provided that rapidly develops as well as continuously maintains the vacuum conditions required within the acceleration column and beam scanner. The vacuum station is equipped with thermocouple as well as ionization gauge tube readouts and overheat protection. In addition, automatic gate valves are provided which isolate the vacuum station when required. The purpose of deflecting the beam in this manner is to produce a wide screen of uniformly distributed electrons at the product. The width of the electron screen may be adjusted to conform to product width.

Electron beam radiation should be of a voltage sufficient to achieve penetration into the product, and of a dosage, high enough to achieve the desired crosslinking. For most applications of the present invention, an electron beam accelerator should be used which is at least 1,000,000 electron volts, preferably at least 3,000,000 electron volts, and most preferably more than 4,000,000 electron volts.

Figure 1:
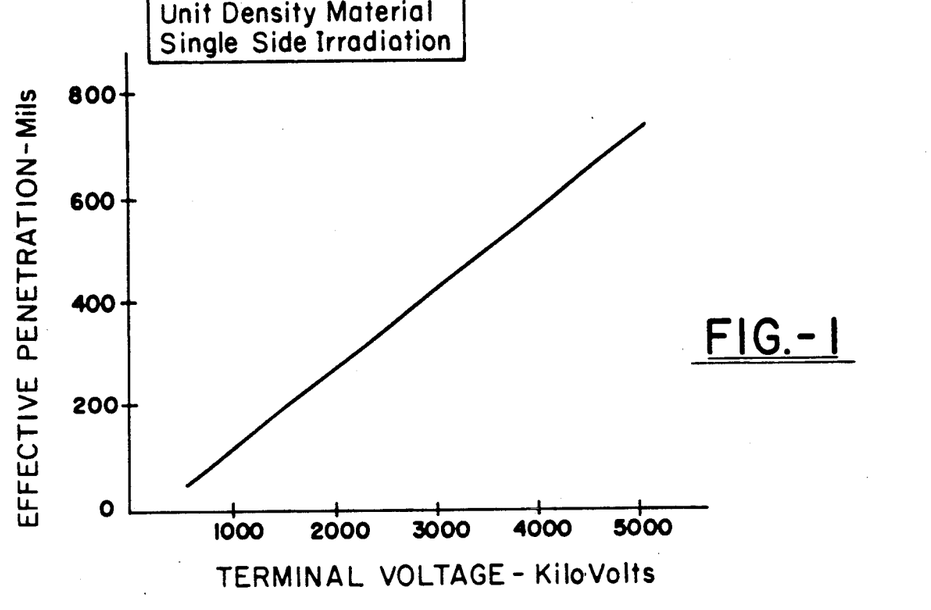
FIG. 1 is a plot of effective penetration of a unit density material versus terminal voltage for single-side irradiation with an electron beam accelerator.

The accelerating voltage (terminal voltage) determines the depth to which the electron beam will penetrate the material, the greater the voltage, the greater the depth of penetration. FIG. 1 shows the relationship of voltage to effective penetration. This relationship is shown for unit density materials; for materials having a relative density other than unity, physical thickness must be divided by density before entering the figure. Products such as wire and cable or reinforcing plastics may be irradiated from two opposing sides; in these cases, effective electron beam penetration is increased by a factor of 2.5. The relationship of voltage is effective penetration for two-sided irradiation is shown by FIG. 2 for unit density material.

Figure 2:
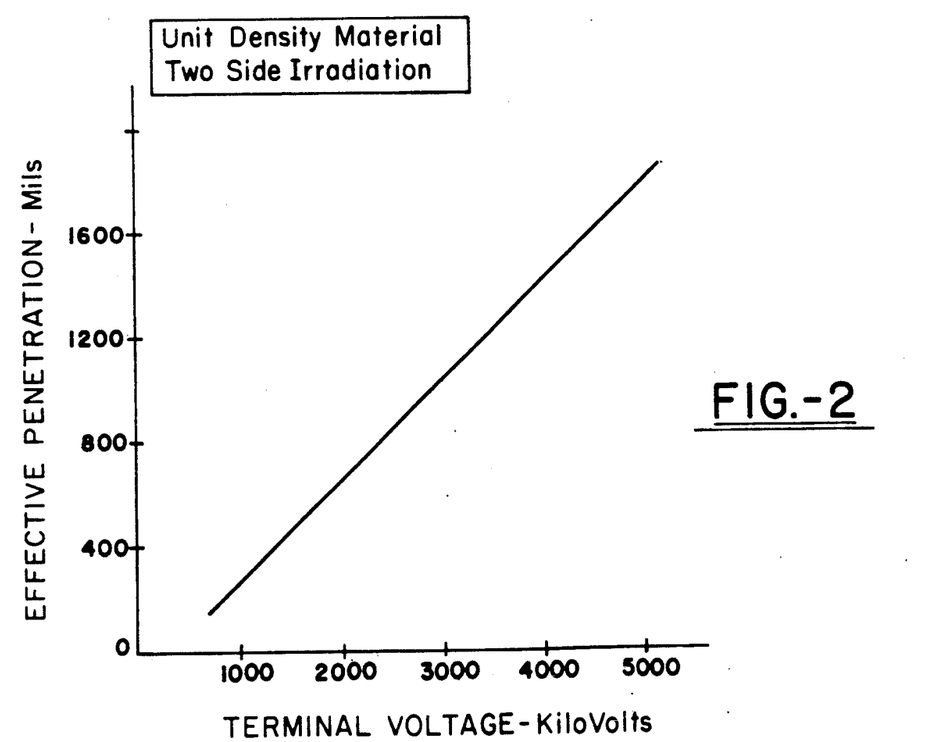
FIG. 2 is a plot of effective penetration of a unit density material versus terminal voltage for two-side irradiation with an electron beam accelerator.

As shown in FIGS. 1 and 2, the 4.5 MeV accelerator can penetrate 0.600" into a unit density material one sided and 1.500" total depth when exposed from both sides. This translates to about 115 depth one sided and about 0.288" penetration two sides for the flexible rare earth magnetic compounds having a typical specific gravity of about 5.20. The effective beam curtain width is about 50" and the amperage is adjusted so that the part receives about 2.5 megarad dosage with each pass under the beam at 20 feet/minute.

For most applications it is preferable that the product is formed during the forming step into a product having a thickness or depth which is no more than about 0.300". Typically, for example, the shape might be a strip having a width of ¼" to 3" and a thickness of 0.030" to 0.300", or a sheet having a width of 3" to 27" and a depth of 0.015" to 0.045".

EXAMPLE 1

This Example shows typical compounding, extrusion, and electron beam curing steps of a highly saturated nitrile elastomer (HSN) binder system with only a processing aid as an additive (no antidegradants) and containing Delco's DRB80924 "Magnequench" powder-screen fractions DEFG (see Tables II and III). The binder system included A-C 617, a low molecular weight polyethylene described previously. The ingredients were compounded for a 65 volume percent target volume loading of rare earth powder, extruded as a 0.065"×0.827" rectangular cross-section strip, and the strip was cured with an electron beam accelerator. The cured strip was then tested for loss of magnetic properties (Br, Hc, Hci) after air-oven heat aging at 150° C. and 175° C. and compared under these aging conditions to a commercial nitrile elastomer (NBR) "Magnequench" magnet, "NEOMAG"-70F produced by Polymag Inc., Belport, N.Y. "NEOMAG" 70F is reported by the manufacturer to contain "Magnequench" powder in a nitrile binder system and which has been extruded/rolled into a strip. It is our understanding that this product contains a chemical cure system and is heat vulcanized.

Sample 1A is prepared according to the recipe below.

| Binder System | |
|---|---|
| Designation: 1A-BS | |
| Ingredients (PPH, WT) | |
| "Zetpol" 1020 | 100.00 |
| 'A-C" 617 | 5.00 |
| Total PPH | 105.00 |
| Specific Gravity = 0.9953 | |
| Rare Earth/Binder System Compound | |
| Designation: 1A | |
| Ingredients (PPH, WT) | |
| 1A-BS Binder System | 100.00 |
| "Magnequench" powder | |
| DRB 80924 - Fractions DEFG | 1412.67 |
| Specific GR. = 7.57 | |
| Total PPH | 1512.67 |
| Calc Specific Gravity = 5.269 | |
| Calc. Volume Loading = 65.0 | |

In the mixing procedure, for a 75 cc batch, "Zetpol" 1020 was banded on a 4 inch diameter mill (friction ratio 1.3 to 1) with the fast roll maintained at 104° C. (220° F.) and the slow roll maintained below 82° C. (180° F.). One half of the A-C 617 was added to the banded "Zetpol" 1020, then the fast roll temperature was raised to 115° C. (240° F.) and approximately one-half of the rare earth powder was incorporated. The remaining A-C 617 was then added, then the remainder of the rare earth powder was added incrementally until the total compound was fully mixed and banded. Both rolls were then cooled to between 23° C. and 55° C. and the compound was sheeted off at 0.040" thickness. Several 75 cc batches were thus processed and the resulting sheets were cut into strips and granulated in a Nelmor Granulator model G66MI, manufactured by Nelmor Company, Inc., North Uxbridge, Mass. The rare earth compound 1A was granulated to −9 mesh size at 3600 rpm with a ¼" screen, with the feed hopper and granulating section kept under a positive pressure of Argon gas. After drying in a vacuum oven for 18 hours at 50° C., these granules were used as feed for the extrusion that followed.

The strip was extruded through a ¾" diameter 10:1 L/D electrically heated-air cooled extruder with a 1.5 compression ratio straight taper screw, using a short (0.600") land length die with a rectangular opening of 0.067"×0.842". The extruder zones were maintained at 105°–110° C. and the die maintained at 115° C. The extrusion conditions as recorded on a Haake Rheocord System 40 and the strip physical properties are shown below.

| Strip 1A | |
|---|---|
| Extruder RPM | 40 |
| Melt Temperature | 119° C. |
| Screw Torque | 3218 meter-grams |
| Die Pressure | 1930 psig |
| Finished Dimensions | .065" × .827" |
| Actual Specific Gravity | 5.104 |
| Actual Volume Loading, Rare Earth | 63.0 percent |
| Estimated Porosity in Strip | 3.13 percent |

The extruded strips were then exposed to electron beam radiation, using a 4.5 MeV electron beam accelerator, manufactured by Radiation Dynamics, Inc. and located at E-Beam Services Inc., Cranbury, N.J. These strips were exposed to the electron beam through the 0.065" thickness from one side with two consecutive passes at 20 feet per minute. This corresponds to 2.5 megarad dosage per pass or 5.0 megarad total dosage.

The radiation cured strip 1A was then aged in hot air ovens along with the Polymag "NEOMAG" 70F strip, one set for 100 hours at 150° C., another set for 100 hours at 175° C. After aging these strips were checked for magnetic hysteresis properties and compared with the original (unaged) samples in the following table.

TABLE IV

Percent Loss of Magnetic Properties of 1A Strip and "NEOMAG"-70F Strip After Hot Air Oven Aging - Compared to Unaged Samples

| | 1A Strip (% Loss) | NEOMAG-70F Strip (% Loss) |
|---|---|---|
| | Hot Air Oven Aged 100 Hrs. @ 150° C. | |
| Br | 1.4 | 14.9 |
| Hc | 6.3 | 22.9 |
| Hci | 13.8 | 39.5 |
| | Hot Air Oven Aged 100 Hrs. @ 175° C. | |
| Br | 4.2 | 28.7 |
| Hc | 11.1 | 35.7 |
| Hci | 22.1 | 53.5 |

The results show better inherent protection for the easily oxidizable "Magnequench" crushed ribbon from the HSN binder system (1A) as compared to the conventional nitrile (NBR) binder system (NEOMAG-70F). This is despite the fact that no antioxidants were used in the 1A binder system and there was about 3 percent porosity in the 1A strip. It is obvious that coatings or platings with the rare earth powder could not only enhance the "wetting out" of the powder with the binder system and thus reduce porosity to near zero, but also provide additional oxidation protection due to the coating itself. This along with antioxidants in the binder system would lead to an order of magnitude preservation of magnetic properties after severe hot air aging conditions.

EXAMPLE 2

Example 2 shows three rare earth "Magnequench"-/binder system compounds involving HSN elastomers with three levels of saturation (90, 96 and 99 percent) and two different levels of bound acrylonitrile in the HSN (36, 44 weight percent). The compounding, sheeting and electron beam curing steps are described for the three compounds (2A, 2B, 2C) and the resultant cured sheets were soaked in seven different solvents for 46 hours at 23° F. and checked for volume percent swell. The compound formulas are shown in Table V and the solvent soak results are shown in Table VI.

TABLE V

| SAMPLE | 2A | 2B | 2C |
| --- | --- | --- | --- |
| Binder System | | | |
| Designation | 2A-BS | 2B-BS | 2C-BS |
| Ingredients | | | |
| "Zetpol" 1020 | 100.00 | 0.00 | 0.00 |
| "Zetpol" 1010 | 0.00 | 100.00 | 0.00 |
| "Zetpol" 2000L | 0.00 | 0.00 | 100.00 |
| Stearic Acid | 0.50 | 0.50 | 0.50 |
| "Naugard" 445 | 1.50 | 1.50 | 1.50 |
| "Vanox" ZMTI | 1.50 | 1.50 | 1.50 |
| "A-C" 617 | 5.00 | 5.00 | 5.00 |
| TOTAL PPH | 108.50 | 108.50 | 108.50 |
| HSN Elastomer Spec | | | |
| Weight % Bound ACN | 44 | 44 | 36 |
| % Saturation | 90 | 96 | 99 |
| Binder System Sp. Gravity | 1.0024 | 1.0024 | 0.9838 |
| Rare Earth/Binder System Compound | | | |
| Designation | 2A | 2B | 2C |
| Ingredients (pph, wt.) | | | |
| 2A-BS | 100.00 | 0.00 | 0.00 |
| 2B-BS | 0.00 | 100.00 | 0.00 |
| 2C-BS | 0.00 | 0.00 | 100.00 |
| "Magnequench" Powder DRB 80924 - Fractions DEFG (sp. grav. = 7.57) | 1402.49 | 1402.49 | 1429.01 |
| Calculated Sp. Grav. | 5.271 | 5.271 | 5.265 |
| Calc. volume % Loading, Rare Earth | 65.0 | 65.0 | 65.0 |

The binder systems were prepared on a four inch mill as indicated in Example 1 except that all the A-C 617 was added as the last step prior to the incremental addition of the rare earth powder. The mill rolls were cooled down to below 55° C. and the binder masterbatch banded before the rare earth powder was added for a 75 cc total batch size. The final compounds 2A, 2B, 2C were sheeted off at 0.027"–0.030" thickness and these sheets were exposed to electron beam radiation curing from one side at E Beam Services, Inc., Cranbury, N.J. using their 4.5 MeV accelerator. Since different levels of unsaturation in the HSN binder systems require different levels of radiation dosage for optimum cure, compounded sheet 2A was exposed to 2 passes at 2.5 Megarad per pass or 5 Megarads total dosage, compounded sheet 2B was exposed to 3 passes at 2.5 Megarads per pass or 7.5 Megarads total dosage and compounded sheet 2C was exposed to 4 passes at 2.5 Megarads per pass or 10.0 Megarads total dosage. These radiation cured sheets were cut into strips and soaked in seven solvents and oils for 46 hours at 23° C. and the volume swell measured. The results are shown in Table VI.

TABLE VI

Solvent Soak Tests
(Volume % Swell 46 hours at 23° C.)

| Sheet Sample Designation | 2A | 2B | 2C |
| --- | --- | --- | --- |
| Radiation Cure Dosage, MR | 5.0 | 7.5 | 10.0 |
| Sheet Thickness, in. | .027 | .029 | .030 |
| Actual Spec. Gravity | 5.155 | 5.097 | 5.097 |
| Actual Vol. % Loading, Rare Earth | 63.6 | 62.8 | 62.9 |
| Estimated Porosity, Vol. % | 2.2 | 3.4 | 3.2 |
| Volume % Swell (46 hrs. @ 23° C.) | | | |
| (1) Toluene | 36.0 | 29.3 | 60.8 |
| (2) Fuel C[1] | 24.6 | 22.5 | 28.7 |
| (3) Heptane | 5.8 | 5.5 | 6.1 |
| (4) ASTM Oil #1 | 2.1 | 3.6 | 1.7 |
| (5) ASTM Oil #3 | 2.9 | 1.4 | 4.5 |
| (6) 2-Propanol | 7.8 | 7.5 | 7.3 |
| (7) MEK | 109.2 | 114.4 | 100.4 |

[1] 50 percent isooctane, 50 percent toluene.

As expected, the lower bound acrylonitrile HSN binder system, 2C, was not as resistant to volume swell in toluene, fuel C and ASTM Oil #3 compound to the 44 percent bound acrylonitrile HSN binder systems (contained in 2A, 2B). However, all cured HSN compounded sheets had less than 5 volume percent swell in both ASTM #1 and ASTM #3 oils.

EXAMPLE 3

Example 3 shows compounding, processing, and electron beam curing steps of two of the preferred rare earth/binder system compounds 3A and 3B, each containing a highly saturated nitrile elastomer (HSN) of at least 42 percent bound acrylonitrile and the DEFG screen fractions of "Magnequench" powder DRB 80924. In this example, the processing aid is "Struktol" TR016 and the total binder system was masterbatched in an internal mixer. The sheets of compounds 3A and 3B were then molded into a thicker laminate of about 0.200" thickness necessitating two-sided exposure from the 4.5 MeV electron beam accelerator since effective penetration from one side is $$\frac{.600''}{5.13} = .117''$$

for compounds of this specific gravity. The cured laminates were then tested for tensile properties in original and hot air oven aged (100 hours at 125° C.) condition. The compound formulations are shown in Table VII and the tensile property results are shown in Table VIII.

TABLE VII

| SAMPLE | 3A | 3B |
| --- | --- | --- |
| Binder System Masterbatch | | |
| Designation | MB-3A | MB-3B |
| Ingredients (pph, wt.) | | |
| "Zetpol" 1020 | 100.00 | 0.00 |
| "THERBAN" 2207 | 0.00 | 100.00 |
| "Naugard" 445 | 2.00 | 2.00 |
| "Vanox" ZMTI | 1.00 | 1.00 |
| "Struktol" TR016 | 3.00 | 3.00 |
| TOTAL PPH | 106.00 | 106.00 |
| Specific Gravity | 1.0062 | 0.9871 |
| Rare Earth/Binder System Compound | | |
| Designation | 3A | 3B |
| Ingredients (pph, wt.) | | |
| MB-3A | 100.00 | 0.00 |
| NB-3B | 0.00 | 100.00 |
| "Magnequench" Powder DRB 80924 - Fractions DEFG, Sp. Grav. - 7.57 | 1397.19 | 1424.23 |

TABLE VII-continued

| SAMPLE | 3A | 3B |
| --- | --- | --- |
| TOTAL, PPH | 1497.19 | 1524.23 |
| Calculated Sp. Grav. | 5.273 | 5.266 |
| Calc. volume % Loading, Rare Earth | 65.0 | 65.0 |

Binder system masterbatches MB-3A and MB-3B were mixed in a Haake Rheocord System 40 Mixer, manufactured by Haake Buchler Instruments, Saddle Brook, N.J. This internal mixer has 50 cc binder volume capacity and was maintained at 140° C. during the six minute mixing cycle and the masterbatch was discharged at a dump temperature of 155° C. Sufficient masterbatched binder system was banded on a four inch diameter mill (1.5 friction ratio) to make a 75 cc final batch of 65 volume percent rare earth loaded compound—batches 3A and 3B. The mill rolls were maintained at 45° C. and the "Magnequench" DRB 80924-fraction DEFG—added incrementally until the rare earth powder was fully incorporated and uniformly mixed. The mixed compound was then calendared to approximately "0.035" thickness using 40° C. temperature on the rolls. Six of these sheets were laminated in a mold using 330° F. (165° C.) mold temperature and 1000 psig pressure, then cooled to below 120° F. (50° C.) before removing the molded part. The moldings were then subjected to two-sided electron beam radiation at 2 passes (5 Megarads) per side or a total of 10 Megarads dosage using the 4.5 MeV accelerator at E Beam Services, Inc., Cranbury, N.J., before testing for original and hot air-aged (100 hours at 125° C.) tensile properties. A summary of molded part, physical makeup, and tensile properties is shown in Table VIII.

TABLE VIII

| SAMPLE | 3A | 3B |
| --- | --- | --- |
| Molded Thickness, in. | .204 | .199 |
| Actual Sp. Grav. | 5.122 | 5.137 |
| Actual Vol. % Loading Rare Earth | 63.1 | 63.4 |
| Estimated Porosity in Molding, Vol. % | 2.86 | 2.46 |
| Electron Beam Dosage | 5.0 MR/2 sides | 5.0 MR/2 sides |

| Tensile Properties (Original and Aged 100 Hours at 125° C.) | | | | |
| --- | --- | --- | --- | --- |
| | 3A Cured 5.0 MR/2 Sides | | 3B Cured 5.0 MR/2 Sides | |
| | Original | Hot Air Oven Aged 100 hrs. @ 125° C. | Original | Hot Air Oven Aged 100 hrs. @ 125° C. |
| $E_y$, Elong. at yield, % | 6.4 | 11.0 | 10.3 | 12.7 |
| $E_b$, Elong. at break, % | 26.3 | 20.9 | 28.6 | 23.5 |
| $T_{max}$, psi | 356 | 424 | 419 | 490 |
| T 5%, psi | 350 | 395 | 369 | 439 |

Note: Crosshead speed = 5"/minute on Instron Machine average of three tests. Samples conditioned to 23° C. and 50 percent RH.

The results show that the electron beam cured HSN binder system bonded rare earth ("Magnequench") samples retain over 20 percent elongation at break even after hot air aging for 100 hours at 125° C. A similar sulfur cured conventional nitrile (NBR) banded "Magnequench" molded part would be severely embrittled after the same heat aging cycle.

While in accordance with the Patent Statutes, the best mode and preferred embodiment has been set forth, the scope of the invention is not limited thereto, but rather by the scope of the attached claims.

What is claimed is:

1. A flexible magnetic blend composition having a maximum energy product of at least 2.5 megagauss-oersteds, a remenance, Br, of at least about 3,400 gauss; a coercive force, Hc of at least about 2900 oersteds; an intrinsic coercivity, $H_{ci}$, of at least about 5,000 oersteds; said composition comprising a mixture of up to 70% by volume of rare earth magnetic particles, and a binder system which comprises a saturated nitrile rubber being at least 85% saturated; said composition after shaping curing by exposure to a high voltage electron beam being able to retain at least about 20 percent tensile elongation at break measured at 23° C. (ASTM D412) after 100 hours of hot air aging at 125° C., and swell less than 5 volume percent in ASTM #1 and #3 oils after 46 hours soak at 23° C., said mixture further being capable of being shaped or formed .in an extruded strip or calendared sheet which will hold its shape before and after high voltage electron beam cure.

2. A flexible magnetic blend composition as set forth in claim 1, wherein said magnetic particles are present at about at least 50 percent by volume of the blend composition.

3. A flexible magnetic blend composition as set forth in claim 2, wherein said binder system comprises at least about 70 percent by weight of a saturated nitrile rubber.

4. A flexible magnetic blend composition as set forth in claim 3 wherein said saturated nitrile rubber has a bound acrylonitrile content of from about 30 to about 50 percent by weight.

5. A flexible magnetic blend composition as set forth in claim 4, wherein said saturated nitrile rubber has a bound acrylonitrile content of from about 34 to about 48 percent by weight.

6. A flexible magnetic blend composition as set forth in claim 5, wherein said saturated nitrile rubber has a bound acrylonitrile content of from about 36 to about 45 percent by weight.

7. A flexible magnetic blend composition as set forth in claim 1, wherein said saturated nitrile rubber is at least about 90 percent saturated.

8. A flexible magnetic blend composition as set forth in claim 2, wherein said magnetic particles comprise at least 60 percent by volume of said blend composition and are comprised of an alloy of one or more of neodymium, praseodymium, and samarium.

9. A flexible magnetic blend composition as set forth in claim 8 wherein said alloy further comprises one or more of iron, boron, and cobalt, and wherein said magnetic particles have a maximum aspect ratio of 6.0.

10. A flexible magnetic blend composition as set forth in claim 3, wherein said binder polymer further comprises up to 30 percent by weight of an impact modified acrylonitrile-methylacrylate thermoplastic copolymer.

11. A flexible magnetic blend composition as set forth in claim 3, wherein said binder polymer further comprises up to about 30 percent by weight of a copolyester thermoplastic elastomer containing both polyether and polyester segments.

12. A flexible magnetic blend composition having a maximum energy product of at least 2.5 megagrams-oersteds, a remenance, Br, of at least about 3,400 gauss; a coercive force, Hc of at least about 2,900 oersteds; an intrinsic coercivity, $H_{ci}$, of at least about 5,000 oersteds; said composition comprising a mixture of up to 70% by volume of rare earth magnetic particles, and a binder system which comprises a saturated nitrile rubber being at least 85% saturated; which is curable by exposure to a high voltage electron beam, said further being capable of being shaped or formed in an extruded strip or calendared sheet which will hold its shape before and after high voltage electron beam cure.

* * * * *